United States Patent Office 3,056,157
Patented Oct. 2, 1962

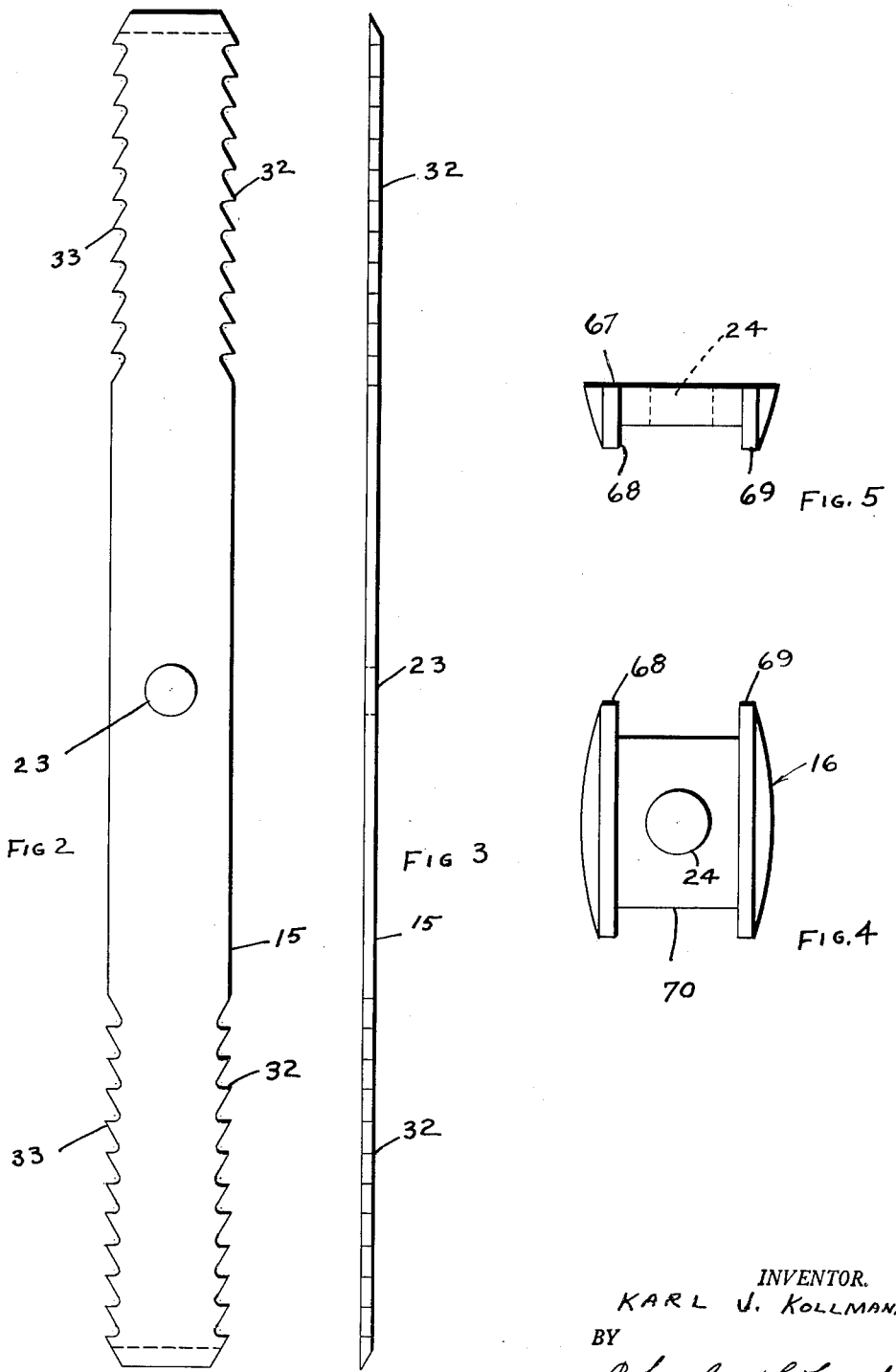

3,056,157
CUTTER HEAD FOR SEWER SNAKES
Karl J. Kollmann, 3615 Sassafras St., Erie, Pa.
Filed Feb. 4, 1960, Ser. No. 6,803
6 Claims. (Cl. 15—104.09)

This invention relates to an improvement in cutter heads for sewer cleaners where it is desirable to provide a cutter head capable of cutting through an obstruction of any cuttable material which may become lodged in a sewer pipe.

Since the idea of cleaning sewer pipes by rotating a cutter was developed, various cutter types have been tried in the attempt to clean pipes thoroughly or to remove obstructions from the pipe and thereby restore the full effective diameter of the pipe. None of these cutters have been entirely successful until the present invention.

It is, accordingly, an object of the present invention to provide a cutter which will efficiently remove roots or other obstructions from sewer pipes to thereby restore the pipes to the proper capacity.

Another object of the invention is to provide a formed cutter made up of a plurality of stacked blades which are held in a relatively rigid position in a single plane with a clamp bolt which can be readily removed and reassembled to provide for very simple and fast blade changes.

Still another object of the invention is to provide a cutter having blades made of flat elongated material having cutting teeth on both edges of the blades.

A further object of the invention is to provide a cutter which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in form, size, proportions, and minor details of construction without departing from the spirit or sacrificing any of the advantages of the invention.

In the drawings:

FIG. 2 is a plan view of a flat elongated blade prior to being formed showing the tooth arrangement and the mounting hole;

FIG. 3 is an edge view of a blade prior to being formed;

FIG. 4 is a plan view of the cylindrical shaped blade fastening device; and

FIG. 5 is a right hand view of the fastening device.

Figure 1:
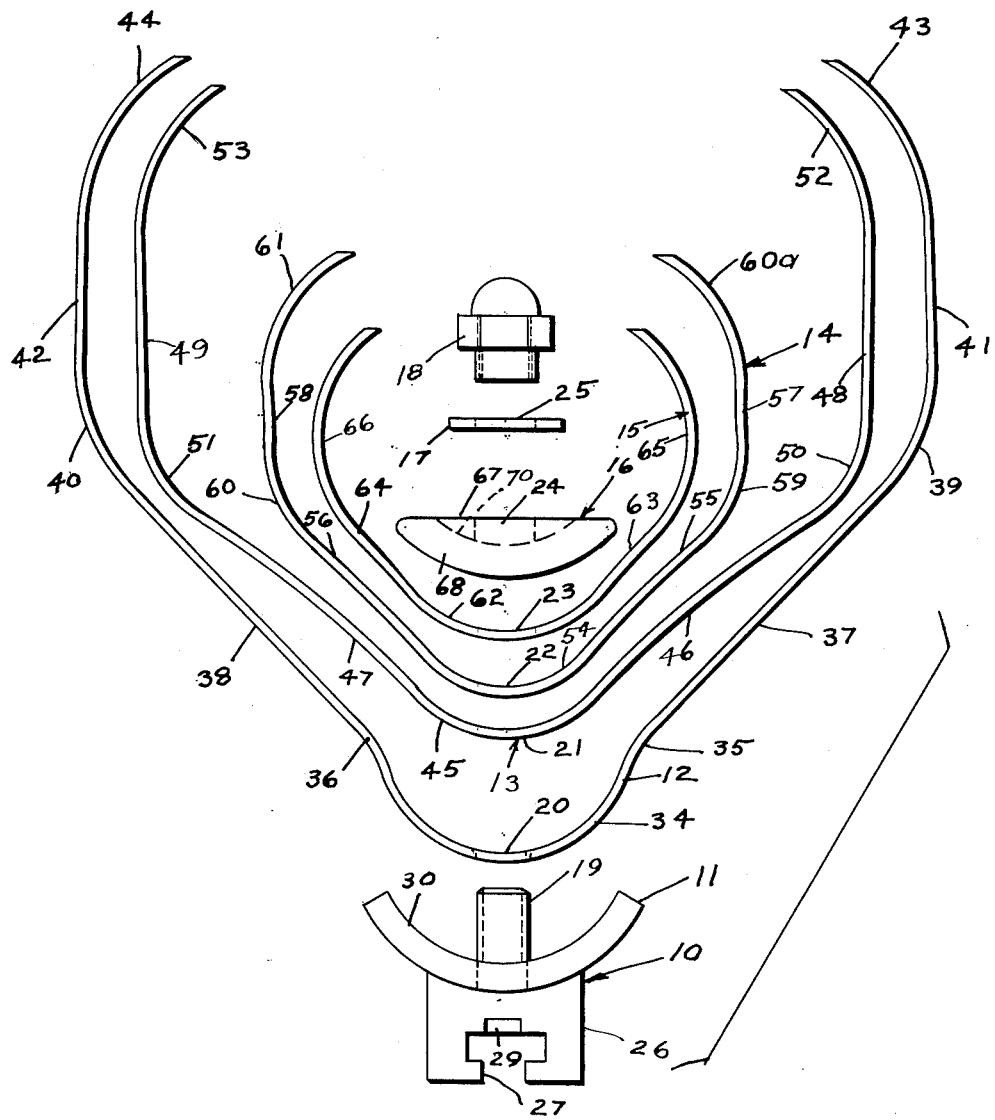
FIG. 1 is an exploded view of a cutter assembly showing the separate parts in a related disassembled position.

Now with more particular reference to the drawings, a coupling 10 has a blade seat 11 attached thereto. The blade seat 11 supports blades 12, 13, 14, and 15 stacked one upon the other and having a threaded member 19 adapted to extend through holes 20, 21, 22, and 23, respectively, and receiving a washer 17 and a nut 18 on the end thereof to hold the blades in clamped stacked relation.

The coupling 10 has a cylindrical body portion 26 with a T-shaped slot 27 in one end for receiving a T-shaped member on the end of a snake having a suitable clamping member for entering a central bore 29. This coupling may be in the form of that shown in Patent No. 2,892,649.

The crescent shaped blade seat 11 is attached integrally to the cylindrical portion 26 or it may be welded thereto if desired. The blade seat 11 has a crescent shaped seating surface 30 which may conform generally to the surface of a cylinder having its axis passing through and perpendicular to the central axis of the cylindrical body and of a slightly lesser radius than that of a portion 34 so that curved portions 43 and 44 will be forced toward each other.

The threaded member 19 may be welded or otherwise attached or integral with the blade seat 11 or with the cylindrical member 26 and it is threaded to receive the internally threaded nut 18.

The blades 12, 13, 14, and 15 are made of flat, elongated, relatively resilient material having teeth 32 and 33 on either side thereof. The teeth 32 and 33 are inclined toward the center hole, thus giving a sliding action toward the direction of movement through a pipe and giving a pulling or gripping action when the tool is withdrawn from a pipe. All of the blades have teeth similar to those shown for the blade 15 in FIGS. 2 and 3.

The intermediate portion 34 of the blade 12 is curved to conform generally to the surface of a cylinder having a slightly larger radius than the cylinder defining the surface 30 so that when the blade 12 is clamped in place, it will firmly engage the entire surface 30 and be distorted inwardly. The blade 12 is then curved outwardly at 35 and 36, has straight portions 37 and 38 inclining outwardly and upwardly, then curved inwardly at 39 and 40, has straight portions 41 and 42, and is then curved inwardly at 43 and 44.

The first intermediate blade 13 has a curved portion 45 which conforms generally to the outside periphery of a cylinder having a radius slightly larger than the cylinder defining the intermediate portion 34. The first intermediate blade 13 then has straight portions 46 and 47 integrally connected to straight portions 48 and 49 by curved portions 50 and 51 and terminating in curved ends 52 and 53.

The second intermediate blade 14 has the curved portion 54 which is slightly larger in diameter than the curved portion 45 of the first intermediate blade 13. The curved portion 54 is connected to straight portions 55 and 56 which in turn are integrally connected to straight portions 57 and 58 by curved portions 59 and 60. The straight portions 57 and 58 terminate in curved portions 60a and 61.

The inner blade 15 has a cylindrical portion 62 integrally connected at each end to straight portions 63 and 64 which, in turn, connect to curved portions 65 and 66.

It will be noted that the curved portions 43, 52, 60a, and 65 are generally concentric to each other and the curved portions 44, 53, 61, and 66 are likewise generally concentric to each other. In like manner, the straight portions 41, 48, and 57 are generally parallel to each other and the straight portions 42, 49, and 58 are generally parallel to each other.

It will also be noted that when the nut 18 is clamped firmly on the threaded member 19, the curved portions 43, 52, 60a, and 65 as well as the curved portions 44, 53, 61, and 66 will be sprung in and be closer toward each other than they are in the position shown.

The closed intermediate blade will therefore be urged inwardly by the outside blade and held thereto with its straight portions converging inwardly and the inwardly curved ends extending toward each other. The blades disposed as shown in FIG. 1 may be said to be arranged with their longitudinal medial lines in a common plane.

A blade retainer 16 has a generally flat upper end 67 and spaced arcuate flanges 68 and 69 spaced from each other by a generally cylindrical surface 70. The cylindrical surface 70 rests on the intermediate portion 62 of the inner blade 15 and is firmly clamped thereon by the washer 17 and the nut 18. The flanges 68 and 69 overlie the blade seat 11 and hold the blades thereto against rotation thereon.

When thus assembled and attached to a suitable sewer machine, the blades will adapt themselves efficiently and clean pipes.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A cutting tool for use on a snake for cleaning sewers comprising a coupling, a plurality of stacked curved blades attached to said coupling and generally concentric to each other, said coupling comprising a generally cylindrical body having a transverse T-shaped slot in a first end thereof for attaching said coupling to said snake, a crescent shaped blade seat attached to a second end of said body, a seating surface on said blade seat, said seating surface conforming to a segment of the surface of a cylinder having its axis passing through and perpendicular to the central axis of said cylindrical body, said blades being made of flat elongated material, an outside portion of one said blade having an intermediate part curved to rest on said seating surface, each end curving outwardly from said intermediate part, then extending straight outwardly and away from said body at an angle of approximately forty-five degrees, then a part curved inwardly and extending from said inwardly curved part parallel to the axis of said body, the distal ends of said outside blade curved inwardly, a first intermediate blade having an intermediate curved part supported on said intermediate part of said outside blade, said first intermediate blade having two straight parts extending outwardly from said curved part thereof and resting on the corresponding part of said outside blade and urged inwardly thereby, said first intermediate blade having a straight part extending in its unstressed position generally parallel to said axis of said body, said first intermediate blade being urged inwardly by said outside blade and held thereby with its last mentioned straight parts converging inwardly, and inwardly curved ends on said last mentioned straight parts, said last mentioned straight parts being spaced inwardly from the outside parallel parts of said outside blade, a second intermediate blade generally shaped like said first intermediate blade and resting thereon with a straight part adjacent each end thereof generally parallel to said axis of said body and spaced inwardly from said straight parts of said first intermediate blade, an inner blade shaped generally like said second intermediate blade and resting thereon, with their longitudinal medial lines in a common plane, a blade retainer, said blade retainer having an arcuate intermediate part supported on the inside surface of the intermediate arcuate part of said inner blade, spaced parallel flanges, one said flange attached to each side of said intermediate part of said blade retainer, said flanges overlying the edges of the arcuate intermediate part of each said blade and said blade seat, a threaded clamp bolt attached to said blade seat with its axis coextensive with said axis of said body, a hole in each said blade, a hole in said blade retainer registering with each said hole in said blades, said clamp bolt extending through said holes, and a nut on said clamp bolt clamping said blades between said blade retainer and said blade seat.

2. A cutting tool for use on a sewer snake comprising a coupling, generally U-shaped blades disposed with their longitudinal medial lines in a common plane and their ends spaced from each other, means attaching an intermediate part of each of said blades to said coupling, said coupling having a generally cylindrical body having a transverse T-shaped slot in one end for attaching said coupling to said snake, a crescent shaped blade seat attached to the second end of said body, a generally cylindrical seating surface on said blade seat, said blades being curved and having a surface conforming generally to said seating surface, a blade retainer, said blade retainer having a generally cylindrical portion overlying the intermediate part of said blades, flanges on said blade retainer overlying said blades and said blade seat, and means clamping said blade retainer to said blade seat, said blades having ends extending from each side of said blade retainer, and teeth on each side of said blades.

3. The cutting tool recited in claim 2 wherein a plurality of said blades are stacked one on each other, and a threaded member is attached to said blade seat and extends through holes in said blades constituting said means for clamping said blade retainer to said blade seat.

4. A sewer cleaner comprising a plurality of generally U-shaped curved blade members made of flat material bent into curved form and stacked one on each other with their medial longitudinal axes in the same plane, one said U-shaped member being inside the other with their ends spaced from each other and generally concentric to each other, a blade retainer, said blade retainer having a curved portion overlying one said blade member and a blade support supporting the blade remote from said one blade member, flanges on said blade retainer overlying said blade support and said blade members, a threaded member carried by said blade support and extending through holes in said blade members, and means attaching a clamping member to the distal end of said threaded member.

5. The sewer cleaner recited in claim 4 wherein said blade members have teeth formed on opposite edges thereof.

6. The sewer cleaner recited in claim 5 wherein said teeth are inclined outwardly and toward said blade support.

References Cited in the file of this patent

UNITED STATES PATENTS

| | | |
|---|---|---|
| 2,292,713 | O'Leary | Aug. 11, 1942 |
| 2,575,634 | Marshall | Nov. 20, 1951 |
| 2,631,113 | O'Brien | Mar. 10, 1953 |
| 2,756,447 | Hogan | July 31, 1956 |